(12) United States Patent
Akagawa

(10) Patent No.: US 7,614,218 B2
(45) Date of Patent: Nov. 10, 2009

(54) EXHAUST EMISSION PURIFYING APPARATUS FOR AND EXHAUST EMISSION PURIFYING METHOD OF INTERNAL COMBUSTION ENGINE

(75) Inventor: Hisashi Akagawa, Ageo (JP)

(73) Assignee: Nissan Diesel Motor Co., Ltd., Ageo-shi (JP)

( * ) Notice: Subject to any disclaimer, the term of this patent is extended or adjusted under 35 U.S.C. 154(b) by 276 days.

(21) Appl. No.: 11/512,379

(22) Filed: Aug. 30, 2006

(65) Prior Publication Data

US 2006/0283178 A1 Dec. 21, 2006

Related U.S. Application Data

(63) Continuation of application No. PCT/JP2005/003144, filed on Feb. 25, 2005.

(30) Foreign Application Priority Data

Mar. 2, 2004 (JP) ............................. 2004-058066

(51) Int. Cl.
*F01N 3/00* (2006.01)
(52) U.S. Cl. .................. 60/295; 60/274; 60/288; 60/297; 60/301; 60/311
(58) Field of Classification Search .................. 60/274, 60/287, 288, 295, 297, 311
See application file for complete search history.

(56) References Cited

U.S. PATENT DOCUMENTS 6,233,927 B1 * 5/2001 Hirota et al. .................. 60/297

| | | | | |
|---|---|---|---|---|
| 6,318,073 | B1 * | 11/2001 | Boegner et al. | 60/274 |
| 6,502,391 | B1 * | 1/2003 | Hirota et al. | 60/288 |
| 6,832,473 | B2 * | 12/2004 | Kupe et al. | 60/286 |
| 7,117,667 | B2 * | 10/2006 | Mital et al. | 60/286 |

FOREIGN PATENT DOCUMENTS

| JP | 4-75124 | 6/1992 |
|---|---|---|
| JP | 6-33735 | 2/1994 |
| JP | 06-093839 | 4/1994 |
| JP | 2000-303826 | 10/2000 |
| JP | 2003-184542 | 7/2003 |

OTHER PUBLICATIONS

International Preliminary Report and Written Opinion issued in corresponding International Application No. PCT/JP2005/003144; and an English-language translation thereof.

* cited by examiner

*Primary Examiner*—Thomas E Denion
*Assistant Examiner*—Diem Tran
(74) *Attorney, Agent, or Firm*—McDermott Will & Emery LLP

(57) ABSTRACT

A particulate filter 8 is disposed in an exhaust passage 7 of an internal combustion engine 1, and a reduction catalyst 9 is disposed downstream of the particulate filter 8. A bypass passage 12 for bypassing the reduction catalyst 9 and a flow path switching valve 13 which switches a flow path for the exhaust gas which has passed through the particulate filter 8 between the exhaust passage 7 and the bypass passage 12 are disposed. A control unit 301 controls the flow path switching valve 13 in association with a temperature Texh of the exhaust gas which has passed through the particulate filter 8.

7 Claims, 5 Drawing Sheets

EXHAUST EMISSION PURIFYING APPARATUS FOR AND EXHAUST EMISSION PURIFYING METHOD OF INTERNAL COMBUSTION ENGINE

This application is a continuation of PCT/JP2005/003144, filed on Feb. 25, 2005.

BACKGROUND OF THE INVENTION

1. Field of the Invention

The present invention relates to an exhaust emission purifying apparatus for an internal combustion engine and an exhaust emission purifying method of the same. More particularly, the invention relates to a technique for enabling a reduction catalyst to avoid any thermal permanent deterioration caused by the exhaust gas which has passed through a particulate filter in an exhaust emission purifying apparatus including such particulate filter arranged for removing particulate matters in the exhaust gas exhausted from an internal combustion engine and a reduction catalyst arranged for purifying nitrogen oxides ("NOx", hereinafter) in the exhaust gas.

2. Description of the Related Art

There is known to provide an apparatus for purifying particulate matters and NOx included in the exhaust gas from an internal combustion engine. In the apparatus, a particulate filter for removing particulate matters in the exhaust gas is disposed in an exhaust passage, and a reduction catalyst for purifying NOx is disposed downstream of the particulate filter (refer to Japanese Unexamined Patent Application Publication No. 2003-184542).

However, this known exhaust emission purifying apparatus for an internal combustion engine has some problems as described below. Namely, when particulate matters on the particulate filter are spontaneously ignited and burned, the temperature of the exhaust gas increases in the particulate filter, and the high temperature exhaust gas flows into the reduction catalyst disposed downstream, thereby thermally degrading the reduction catalyst. It is known that the thermal degradation of the reduction catalyst results in unrecoverable permanent deterioration. Conventionally, concerning an exhaust emission purifying apparatus for an internal combustion engine including a particulate filter, in order to avoid clogging of the particulate filter caused by excessive deposition of particulate matters, it is known that either an injection timing of fuel is adjusted to increase the temperature of the exhaust gas, or the exhaust gas is heated by an electric heater or a burner to periodically burn deposited particulate matters so as to regenerate the particulate filter. The degradation of the reduction catalyst caused by inflow of the high temperature exhaust gas occurs not only in case of the spontaneous ignition, but also when particulate matters on the particulate filter are intentionally burned for the regeneration purpose.

SUMMARY OF THE INVENTION

Therefore, an object of the present invention is to avoid degradation of a reduction catalyst that might be caused by inflow of a high temperature exhaust gas having passed through a particulate filter.

The present invention provides an exhaust emission purifying apparatus for an internal combustion engine and an exhaust emission purifying method of the same in which the above-mentioned object is addressed.

An exhaust emission purifying apparatus according to the present invention includes a particulate filter disposed in an exhaust passage for collecting particulate matters in the exhaust gas, a reduction catalyst disposed downstream of the particulate filter in the exhaust passage for accelerating the reductive purification of nitrogen oxides in the exhaust gas, a bypass passage arranged to diverge from the exhaust passage downstream of the particulate filter thereby extending to bypass the reduction catalyst and to merge with the exhaust passage downstream of the reduction catalyst, a flow path switching valve for switching a flow path that the exhaust gas having passed through the particulate filter flows between the exhaust passage and the bypass passage, and a control unit for controlling the switching valve in association with a temperature of the exhaust gas having passed through the particulate filter.

In an exhaust emission purifying method according to the present invention, a particulate filter and a reduction catalyst are disposed in an exhaust passage in this order from the upstream, and a bypass passage which allows the exhaust gas to bypass the reduction catalyst is provided downstream of the particulate filter. In a first operating period when a temperature of the exhaust gas having passed through the particulate filter is relatively low, the exhaust gas having passed through the particulate filter is allowed to flow into the reduction catalyst so that removal of particulate matters in the exhaust gas by the particulate filter and purification of nitrogen oxides in the exhaust gas by the reduction catalyst are achieved, and in a second operating period when the temperature of the exhaust gas having passed through the particulate filter becomes higher than that in the first operating period, the exhaust gas having passed through the particulate filter is allowed to flow into the bypass passage, to thereby urge the exhaust gas to bypass the reduction catalyst.

In accordance with the present invention, the flow path switching valve is controlled in association with the temperature of the exhaust gas having passed through the particulate filter, so that the flow path for permitting the exhaust gas to flow is switched between the exhaust passage and the bypass passage. Therefore, the high temperature exhaust gas having passed through the particulate filter may bypass through the bypass passage, and degradation of the reduction catalyst can be prevented.

The above and other objects as well as features of the invention will be more understood by the ensuing description with reference to the accompanying drawings.

The entire content of Japanese Patent Application No. 2004-058066 which makes a basis of claiming for priority is incorporated herein by reference.

DESCRIPTION OF THE PREFERRED EMBODIMENT

Embodiments of the present invention will be explained with reference to the accompanying drawings.

Figure 1:
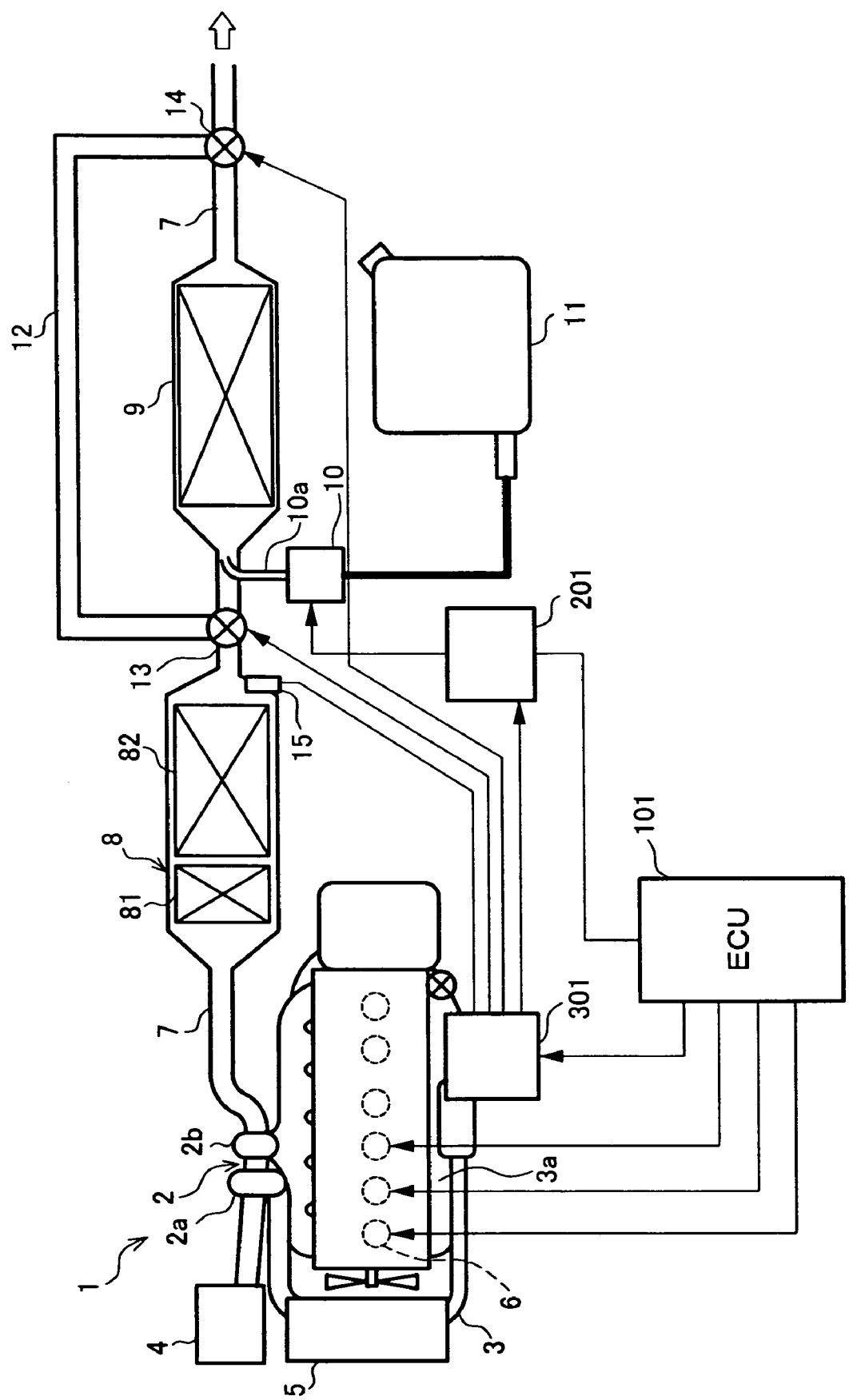
FIG. 1 is a diagram of a structure of an exhaust emission purifying apparatus of an internal combustion engine according to a first embodiment of the present invention.

FIG. 1 shows a structure of an internal combustion engine 1 according to a first embodiment of the present invention. In this embodiment, a diesel engine ("engine", hereinafter) including a turbocharger 2 is employed as the internal combustion engine 1.

In the engine 1, an air cleaner 4 is mounted on an introducing section of an intake passage 3, and the dust in the sucked air is removed by the air cleaner 4. A compressor 2a of a turbocharger 2 is disposed downstream of the air cleaner 4, and the air is compressed and sent out by the compressor 2a. The sent-out air is cooled by an intercooler 5 disposed downstream and then, is distributed to each cylinder in a manifold section 3a.

The engine 1 is a direct-injection type diesel engine, and an injector 6 for supplying fuel is disposed in each cylinder. The Fuel is directly injected into the cylinder by the injector 6.

On the other hand, in an exhaust passage 7, a turbine 2b of the turbocharger 2 is disposed downstream of a manifold section 7a. The turbine 2b is driven by the exhaust gas discharged from the cylinder, and the compressor 2a coaxially connected to the turbine 2b is operated. A diesel particulate filter 8 is disposed downstream of the turbine 2b. The diesel particulate filter 8 functions as the "particulate filter" which collects particulate matters. A reduction catalyst 9 which accelerates the reduction of NOx in the exhaust gas is disposed downstream of the diesel particulate filter 8. In this embodiment, a diesel particulate filter having a continuously regenerating function ("continuously regenerating DPF", hereinafter) is employed as the diesel particulate filter 8.

The continuously regenerating DPF 8 includes a filter element 82 for collecting particulate matters, and an oxidation catalyst 81 disposed upstream of the filter element 82. The oxidation catalyst 81 oxidizes nitric oxide in the exhaust gas to produce nitrogen dioxide, and the particulate matters on the filter element 82 are converted into carbon dioxide by the generated nitrogen dioxide. That is, the continuously regenerating DPF 8 can continuously burn deposited particulate matters to regenerate the continuously regenerating DPF 8, while can remove particulate matters from the exhaust gas. Further, a filter regenerator is provided for regeneration in case of traffic congestion or the like, when the exhaust gas is low in temperature. The filter regenerator delays the injection timing of fuel of the injector 6 to rise the temperature of the exhaust gas, activates the oxidation catalyst 81 to increase an amount of nitrogen dioxide to be generated, and particulate matters on the filter element 82 are forcibly burned. In this embodiment, an engine control unit 101 is provided with a function as the "filter regenerator".

A reducing agent addition device 10 is disposed downstream of the continuously regenerating DPF 8. The addition device 10, which adds urea water as a reducing agent for NOx to the exhaust gas flowing into the reduction catalyst 9, includes an injection nozzle 10a. The injection nozzle 10a penetrates a wall of the exhaust passage 7, and is inserted into the exhaust passage 7. The addition device 10 is provided with a pump therein, and sucks urea water from a storage tank 11 to add the urea water to the exhaust gas by the injection nozzle 10a. The pump in the addition device 10 is controlled by a signal from a reducing agent addition control unit 201, and the addition device 10 adds a predetermined amount of urea water. An operation state of the engine 1 from the engine control unit 101 is inputted into the reducing agent addition control unit 201, and the reducing agent addition control unit 201 controls an amount of urea water to be added based on the inputted operation state. The added urea water is hydrolyzed by heat of the exhaust gas to generate ammonia, the generated ammonia and NOx in the exhaust gas react with each other on the reduction catalyst 9 and NOx is purified.

A bypass passage 12 for bypassing the reduction catalyst 9 is provided downstream of the continuously regenerating DPF 8. The bypass passage 12 is connected to the exhaust passage 7 on the upstream and downstream sides of the reduction catalyst 9, and forms a flow path for the exhaust gas which diverges from the exhaust passage 7 upstream of the reduction catalyst 9 and the injection nozzle 10a, bypasses the reduction catalyst 9, and merges with the exhaust passage 7 downstream of the reduction catalyst 9. A first switching valve 13 as a "flow path switching valve" is disposed at the diverging point between the exhaust passage 7 and the bypass passage 12, and a second switching valve 14 as a "flow path shut-off valve" is disposed at the merging point between the exhaust passage 7 and the bypass passage 12. The flow path for the exhaust gas having passed through the continuously regenerating DPF 8 is switched between the exhaust passage 7 and the bypass passage 12 by the first and second switching valves 13 and 14. The first and second switching valves 13 and 14 are operated by a signal from the exhaust gas bypass control unit 301. That is, the first and second switching valves 13 and 14 allow the exhaust gas to flow into the reduction catalyst 9 by an OFF signal from the exhaust gas bypass control unit 301, and switch the flow path for the exhaust gas to the bypass passage 12 by an ON signal, and allow the exhaust gas to bypass the reduction catalyst 9. In addition to such control of the valves, the exhaust gas bypass control unit 301 also outputs a signal to the reducing agent addition control unit 201, and stops the adding operation of urea water. Although the "flow path shut-off valve" is one that interrupts the flow of the exhaust gas, the second switching valve 14, which selectively sets the flow path for the exhaust gas, has such function in this embodiment.

A temperature sensor 15 is disposed in the exhaust passage 7 upstream of the reduction catalyst 9. The temperature sensor 15 detects the temperature of the exhaust gas having passed through the continuously regenerating DPF 8. In this embodiment, the temperature sensor 15 is disposed in a housing of a filter element 82 (and oxidation catalyst 81) of the continuously regenerating DPF 8. A detection signal of the temperature sensor 15 is inputted to the exhaust gas bypass control unit 301 and is employed in the control of the first and second switching valves 13 and 14.

The operation of the exhaust gas bypass control unit 301 will be explained with reference to a flowchart.

Figure 2:
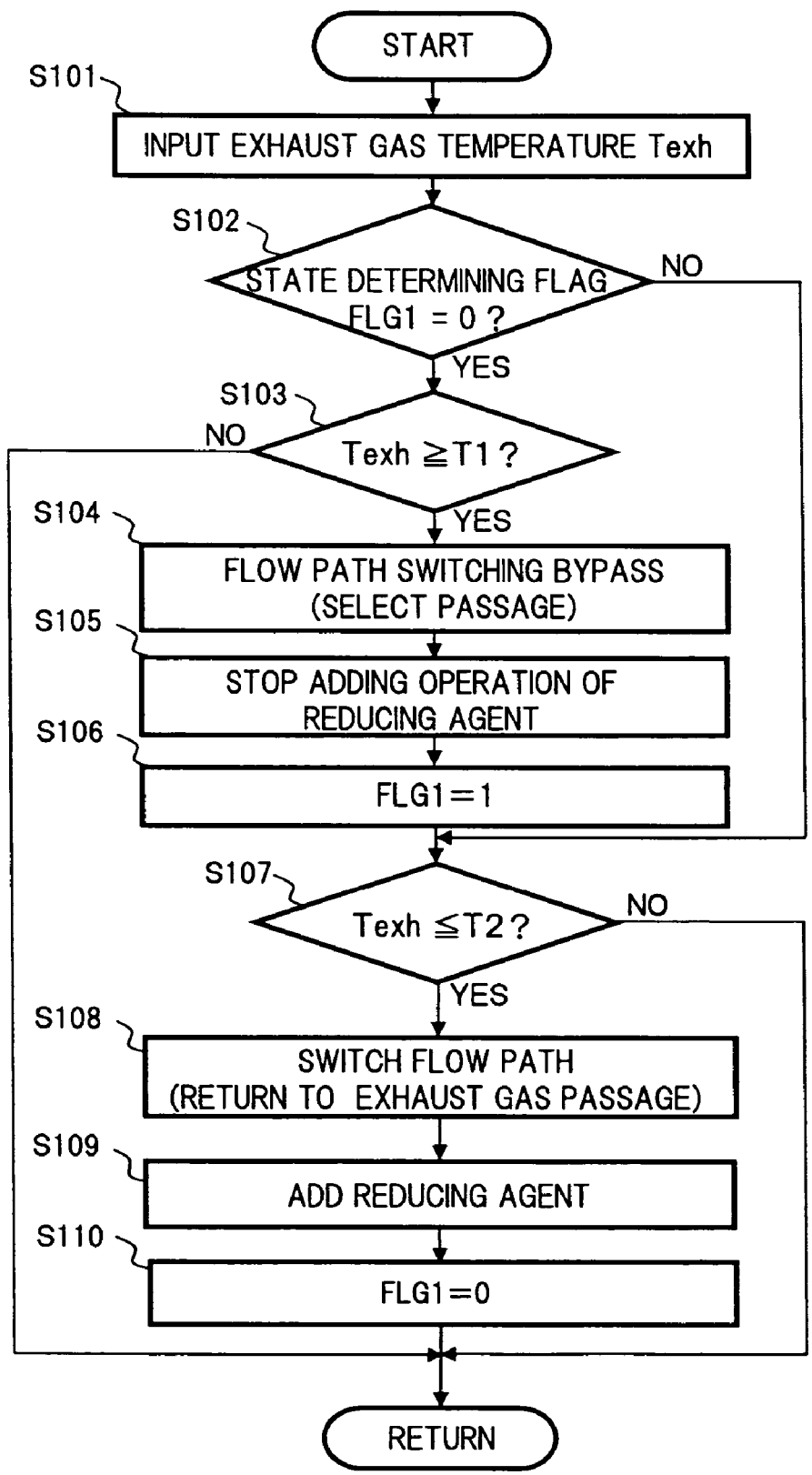
FIG. 2 is a flowchart of an exhaust gas bypass routine according to the first embodiment.

FIG. 2 is a flowchart of the exhaust gas bypass routine. The exhaust gas bypass control unit 301 is actuated when a power supply switch such as a key switch is turned ON, and the exhaust gas bypass control unit 301 starts control. The exhaust gas bypass control unit 301 repeatedly executes this routine every predetermined time.

In S101, an exhaust gas temperature Texh detected by the temperature sensor 15 is read in.

In S102, it is determined whether or not a value of a state determination flag FLG1 is 0. When the value is 0, the procedure is proceeded to S103, and if the value is not 0, the procedure is proceeded to S107. The state determination flag FLG1 is set to 0 or 1 in this routine. When the exhaust passage 7 is selected as a flow path of the exhaust gas, the state determination flag FLG1 is set to 0, and when the bypass passage 12 is selected, the state determination flag FLG1 is set to 1.

In S103, it is determined whether or not the read exhaust gas temperature Texh is equal to or higher than a first temperature T1 which is set as a relatively high temperature. If the exhaust gas temperature Texh is equal to or higher than T1, the procedure is proceeded to S104, and when the exhaust gas temperature Texh is lower than T1, this routine is completed. The first temperature T1 is set to as high a temperature as possible as an exhaust gas temperature within a range where the reduction catalyst 9 is not deteriorated. This is because the amount of NOx discharged by bypassing the reduction catalyst 9 is suppressed to the minimum.

In S104, ON signals are outputted to the first and second switching valves 13 and 14, so that the flow path for the exhaust gas having passed through the continuously regenerating DPF 8 is switched to the bypass passage 12 to bypass the reduction catalyst 9.

In S105, a signal is outputted to the reducing agent addition device 10, to thereby stop the adding operation of urea water.

In S106, the value of the state determination flag FLG1 is set to 1.

In S107, it is determined whether or not the read exhaust gas temperature Texh is equal to or lower than a second temperature T2. If the exhaust gas temperature Texh is equal to or lower than T2, the procedure proceeds to S108, and when the exhaust gas temperature Texh is higher than T2, this routine is terminated. The second temperature T2 is set to a temperature lower than the first temperature T1 to prevent chattering in the valve control system.

In S108, OFF signals are outputted to the first and second switching valves 13 and 14, the flow path for the exhaust gas having passed through the continuously regenerating DPF 8 is switched to or returned to the exhaust passage 7, and the exhaust gas is allowed to flow into the reduction catalyst 9.

In S109, a signal is outputted to the addition device 10, to thereby restart the adding operation of urea water.

In S110, a value of a state determination flag FLUG is set to 0.

Figure 3:
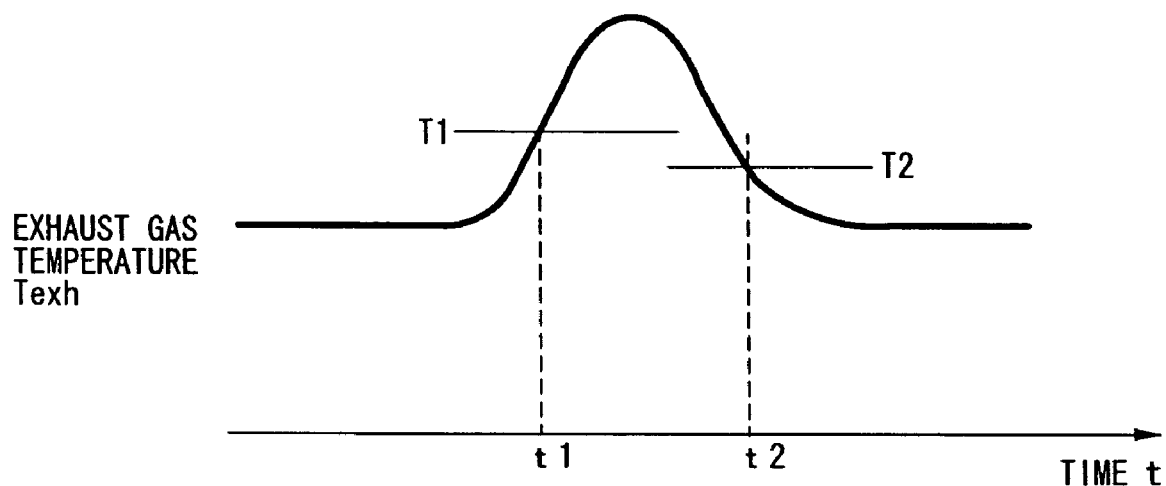
FIG. 3 is an explanatory view of operation of an exhaust gas bypass control unit according to the first embodiment.

Here, the operation of the exhaust gas bypass control unit 301 will be explained with reference to the time chart shown in FIG. 3.

In normal period (corresponding to "first operating period"), the exhaust gas passes through the continuously regenerating DPF 8 and then, flows into the reduction catalyst 9 through the exhaust passage 7. In the continuously regenerating DPF 8, particulate matters are removed from the exhaust gas by the filter element 82, and the particulate matters on the filter element 82 are continuously processed based on the function of the oxidation catalyst 81. The exhaust gas bypass control unit 301 reads in the temperature Texh of the exhaust gas which has passed through the continuously regenerating DPF 8, the first and second switching valves 13 and 14 are held in the OFF state until the temperature reaches the first temperature T1, and the exhaust gas which has passed through the continuously regenerating DPF 8 is allowed to flow into the reduction catalyst 9. Urea water in an amount suitable for the operating state of the engine 1 is added to the exhaust gas flowing into the reduction catalyst 9 by the reducing agent addition device 10. With this operation, the NOx in the exhaust gas is efficiently reduced on the reduction catalyst 9 and purified.

If the exhaust gas temperature Texh under the same driving requirement (determined as required load per rotating speed for example) for the engine 1 is increased due to spontaneous combustion of particulate matters on the filter element 82 and the exhaust gas temperature Texh reaches the first temperature T1 (time t1), the exhaust gas bypass control unit 301 outputs ON signals to the first and second switching valves 13 and 14, the exhaust gas which has passed through the continuously regenerating DPF 8 is allowed to flow into the bypass passage 12 to bypass the reduction catalyst 9. As described above, since the first temperature T1 is set to a value as high as possible within a range where the reduction catalyst 9 is not deteriorated, it is possible to suppress discharge of NOx and to prevent the reduction catalyst 9 from being deteriorated. To avoid wasteful consumption of urea water at the time of bypassing of the exhaust gas (corresponding to "second operating period") and retention of urea water in the exhaust passage 7, the exhaust gas bypass control unit 301 outputs a signal to the reducing agent addition control unit 201 to thereby stop the adding operation of urea water.

If the exhaust gas temperature Texh is lowered and the temperature reaches the second temperature T2 (time t2), the exhaust gas bypass control unit 301 outputs OFF signals to the first and second switching valves 13 and 14, so that the flow path for the exhaust gas is set to the exhaust passage 7, and the exhaust gas which has passed through the continuously regenerating DPF 8 is allowed to flow into the reduction catalyst 9. Further, the exhaust gas bypass control unit 301 outputs a signal to the reducing agent addition device 10 to thereby restart the adding operation of urea water.

The effects of this embodiment are summarized as follows.

First, the bypass passage 12 is provided downstream of the continuously regenerating DPF 8. When the temperature Texh of exhaust gas which has passed through the continuously regenerating DPF 8 rises and reaches the first temperature T1, the flow path for the exhaust gas is switched to the bypass passage 12 to bypass the reduction catalyst 9. Thus, it is possible to avoid degradation of the reduction catalyst 9 due to inflow of the high temperature exhaust gas into the reduction catalyst 9.

Secondly, when the flow path for the exhaust gas is switched to the bypass passage 12 and then the exhaust gas temperature Texh is lowered and reaches the second temperature T2 which is lower than the first temperature T1, the flow path for the exhaust gas is returned to the exhaust passage 7. Thus, when the exhaust gas temperature Texh is varied within the narrow range around the first temperature T1, it is possible to prevent the chattering in the valve control system.

Thirdly, the second switching valve 14 is disposed at the merging point between the bypass passage 12 and the exhaust passage 7, and the first and second switching valves 13 and 14 are operated in synchronization with each other so as to switch the flow path for the exhaust gas. Thus, at the time of bypassing of the exhaust gas, it is possible to prevent the exhaust gas which has passed through the bypass passage 12 from back flowing toward the reduction catalyst 9.

Another embodiment of the present invention will be explained below.

Figure 4:
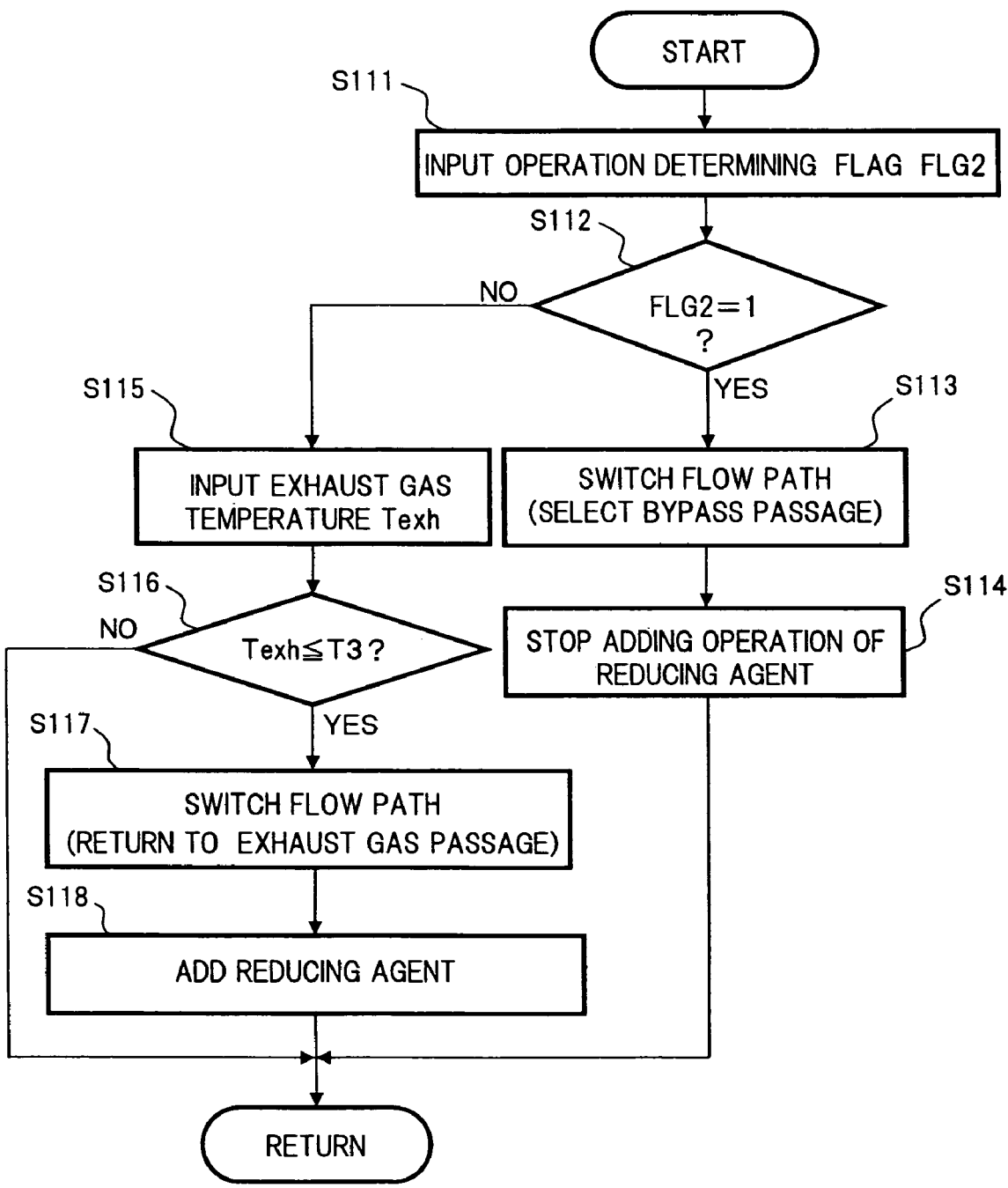
FIG. 4 is a flowchart of an exhaust gas bypass routine according to a second embodiment of the present invention.

FIG. 4 is a flowchart of an exhaust gas bypass routine according to a second embodiment of the present invention. Like the first embodiment, the routine of the second embodiment is executed when a power supply switch is turned ON and is repeated every predetermined time. The structures of the internal combustion engines of the second embodiment and of a later-described third embodiment are the same as that of the first embodiment, and a direct-injection type diesel engine 1 in which the continuously regenerating DPF 8 and the reduction catalyst 9 are disposed in the exhaust passage 7 is employed.

In S111, an operation determination flag FLG2 is read in. The operation determination flag FLG2 shows whether or not it is the regenerating period in which the continuously regenerating DPF 8 is forcibly regenerated by delaying the fuel injection timing. The operation determination flag FLG2 is set to 0 or 1 by the engine control unit 101, and it is outputted to the exhaust gas bypass control unit 301. The operation determination flag FLG2 is set to 1 when the current time is in the regenerating period, and is set to 0 at the normal period other than the regenerating period.

In S112, it is determined whether or not the value of the operation determination flag FLG2 is 1. When the operation determination flag FLG2 is 1, it is determined that the current time is in the regenerating period, the procedure is proceeded to S113, and if the operation determination flag FLG2 is not 1 (i.e., 0), it is determined that the current time is in the normal period and the procedure is proceeded to S115.

In S113, ON signals are outputted to the first and second switching valves 13 and 14, the flow path for the exhaust gas which has passed through the continuously regenerating DPF 8 is switched to the bypass passage 12.

In S114, a signal is outputted to the reducing agent addition device 10, to stop the adding operation of urea water.

In S115, the exhaust gas temperature Texh detected by the temperature sensor 15 is read in.

In S116, it is determined whether or not the read exhaust gas temperature Texh is equal to or lower than a predetermined temperature T3. When the exhaust gas temperature Texh is equal to or lower than T3, the procedure proceeds to S117, and when the exhaust gas temperature Texh is higher than T3, this routine is terminated. That is, when the forcible regeneration which is carried out by delaying the fuel injection timing is completed and when the exhaust gas temperature Texh is sufficiently lowered, the processing of S117 and subsequent steps are carried out. The predetermined temperature T3 corresponds to a "third temperature", and this value may be set as the upper limit temperature within a range in which the reduction catalyst 9 is not degraded, as well as a lower temperature than the upper limit temperature to allow a margin.

In S117, OFF signals are outputted to the first and second switching valves 13 and 14, to return the flow path for the exhaust gas which has passed through the continuously regenerating DPF 8 to the exhaust passage 7.

In S118, a signal is outputted to the reducing agent addition device 10, to restart the adding operation of urea water.

According to this embodiment, the following effects can be obtained.

That is, in this embodiment, at the time of forcibly regenerating operation for the continuously regenerating DPF 8, the flow path for the exhaust gas is switched to the bypass passage 12 to bypass the reduction catalyst 9. Thus, by the forcible regeneration which is carried out by delaying the fuel injection timing, it is possible to avoid a case in which the high temperature exhaust gas flows into the reduction catalyst 9 from the continuously regenerating DPF 8 and the reduction catalyst 9 is degraded.

Further, in this embodiment, after the forcibly regenerating operation is completed, the flow path for the exhaust gas is returned on condition that the exhaust gas temperature Texh is lowered. Thus, it is possible to avoid a case in which the reduction catalyst 9 is deteriorated by inflow of the relatively high temperature exhaust gas immediately after the forcibly regenerating operation is completed.

Figure 5:
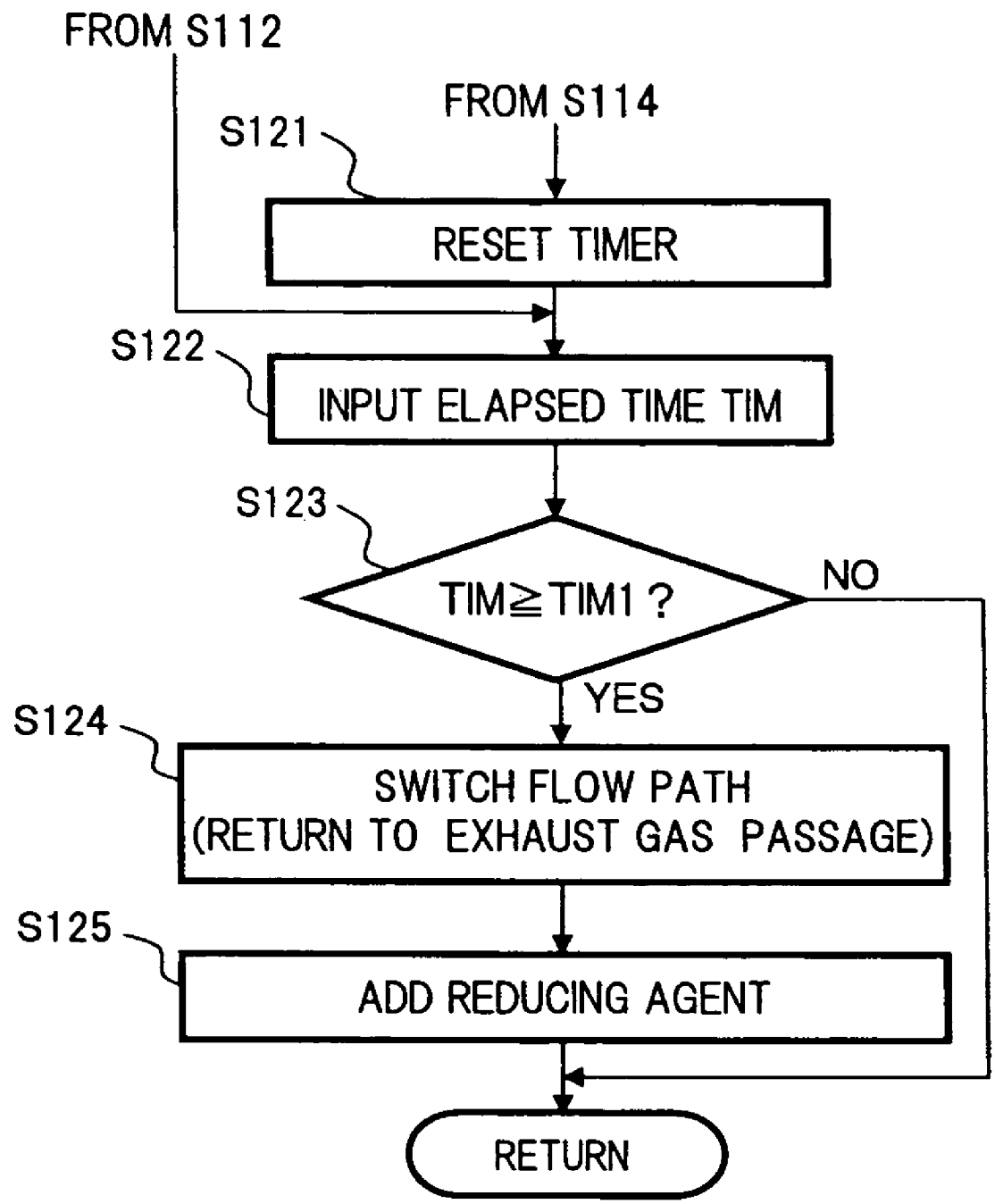
FIG. 5 is a flowchart of an exhaust gas bypass routine according to a third embodiment of the present invention.

FIG. 5 is a flowchart of an exhaust gas bypass routine according to a third embodiment of the present invention. This routine is also executed when a power supply switch is turned ON, and is repeated every predetermined time. The exhaust gas bypass control unit 301 of this embodiment is provided with a timer, and the elapsed time TIM after the completion of regeneration is counted by the timer.

In the regenerating period, a value of the timer is held at 0 (S121). If the forcibly regenerating operation for the continuously regenerating DPF 8 is completed and it is determined that the operation determination flag FLG2 is 0, the procedure proceeds to S122, and the processing of the following step is executed.

In S122, the value TIM of the timer is read in as the elapsed time after the regenerating operation is completed.

In S123, it is determined whether or not the read elapsed time TIM reaches predetermined time TIM1. If TIM reaches TIM1, the procedure is proceeded to S124, or else, this routine is returned.

In S124, it is determined that the exhaust gas temperature Texh is sufficiently lowered, and OFF signals are outputted to the first and second switching valves 13 and 14, to return the flow path for the exhaust gas which has passed the continuously regenerating DPF 8 to the exhaust passage 7.

In S125, a signal is outputted to the reducing agent addition device 10, to restart the adding operation of urea water.

According to this embodiment, the following effects can be obtained.

That is, the flow path for the exhaust gas is switched to the bypass passage 12 when the continuously regenerating DPF 8 is forcibly regenerated, and after the regenerating operation is completed, the flow path for the exhaust gas is returned after the exhaust gas temperature Texh is lowered. Therefore, the same effect as that of the second embodiment can be obtained. Especially, in this embodiment, since the exhaust gas bypass control unit 301 is provided with the timer and the elapsed time TIM after completion of the regeneration is employed, it is possible to set a reliable timing at which the flow path is returned without actually measuring the exhaust gas temperature Texh.

The continuously regenerating DPF 8 may be forcibly regenerated either by rising the temperature of the exhaust gas when the exhaust gas is exhausted from the engine cylinder, or by heating the filter element 82 or the exhaust gas flowing into the filter element 82 by an electric heater or a burner.

As the particulate filter, in addition to the continuously regenerating type filter described hereinbefore, it is possible to employ a particulate filter which estimates an amount of deposited particulate matters based on mileage. And when the estimated deposition amount reaches a predetermined amount, the injection timing of fuel is adjusted to regenerate the particulate filter.

The present invention can be applied to an exhaust emission purifying apparatus of other types of diesel engine than the direct-injection type diesel engine.

Although the present invention has been described by way of some preferable embodiments, the scope and spirit of the present invention is not limited by the explanation, but is determined in accordance with application text based on the description of the appended claims.

I claim:

1. An exhaust emission purifying apparatus of an internal combustion engine, comprising:
    a particulate filter disposed in an exhaust passage of the engine for collecting particulate matters in the exhaust gas of the engine;
    a reduction catalyst that accelerates the reductive purification of nitrogen oxides in the exhaust gas, the reduction catalyst being disposed downstream of the particulate filter in the exhaust passage;
    a bypass passage arranged to diverge from the exhaust passage downstream of the particulate filter thereby extending to bypass the reduction catalyst and to merge with the exhaust passage downstream of the reduction catalyst;

a flow path switching valve disposed for switching a flow path that the exhaust gas having passed through the particulate filter flows between the exhaust passage and the bypass passage;

a temperature sensor disposed upstream of the reduction catalyst in the exhaust passage for detecting a temperature of the exhaust gas having passed through the particulate filter;

a control unit configured to control the switching valve in association with the temperature of the exhaust gas detected by the temperature sensor; and a filter regenerator configured to forcibly burn particulate matters collected by the particulate filter to regenerate the particulate filter, wherein, in a regenerating period of the particulate filter when the particulate filter is regenerated by the filter regenerator, the control unit switches the flow path for the exhaust gas having passed through the particulate filter to the bypass passage, and wherein, after the regeneration period of the particulate filter is completed, the control unit switches the flow path for the exhaust gas to the exhaust passage when the temperature of the exhaust gas detected by the temperature sensor falls and reaches a predetermined temperature.

2. The apparatus according to claim 1, wherein, after a predetermined time is elapsed after the regeneration of the particulate filter by the filter regenerator is completed, the control unit switches the flow path for the exhaust gas to the exhaust passage.

3. The apparatus according to claim 1 further comprising a flow path shut-off valve disposed at the merging portion of the exhaust passage where the bypass passage merges with the exhaust passage, for selectively shutting off the flow of the exhaust gas upstream of the merging portion in a closed state wherein the control unit closes the shut-off valve in synchronization with the switching of the flow path to the bypass passage.

4. The apparatus according to claim 1 further comprising a reducing agent addition device disposed downstream of the particulate filter for adding a reducing agent for nitrogen oxides to the exhaust gas flowing into the reduction catalyst.

5. The apparatus according to claim 4, wherein, in the regenerating period of the particulate filter, the control unit stops the adding operation of the reducing agent by the addition device.

6. An exhaust emission purifying apparatus of an internal combustion engine, comprising:

collecting means for collecting particulate matters in the exhaust gas of the engine, the collecting means being disposed in an exhaust passage of the engine;

purifying means for purifying nitrogen oxides in the exhaust gas with a catalyst, the purifying means being disposed in the exhaust passage downstream of the collecting means;

bypassing means for allowing the exhaust gas to bypass the purifying means downstream of the collecting means;

switching means for selectively allowing the exhaust gas having passed through the collecting means to flow through the bypassing means;

detecting means for detecting a temperature of the exhaust gas having passed through the collecting means, the detecting means being disposed in the exhaust passage upstream of the purifying means;

controlling means for controlling the flow of the exhaust gas to the bypassing means by the switching means in association with the temperature of the exhaust gas detected by the detecting means; and regenerating means for forcibly burning particulate matters collected by the collecting means to regenerate the collecting means, wherein, in a regenerating period of the collecting means conducted by the regenerating means, the controlling means urges the exhaust gas having passed through the collecting means to flow through the bypassing means and thereby bypass the purifying means, and wherein, after the regenerating period of the collecting means is completed, the controlling means controls the flow of the exhaust gas to the exhaust passage when the temperature of the exhaust gas detected by the detecting means falls and reaches a predetermined temperature.

7. An exhaust emission purifying method of an internal combustion engine, in which a particulate filter for collecting particulate matters in the exhaust gas of the engine and a reduction catalyst for accelerating the reduction of nitrogen oxides in the exhaust gas are disposed in an exhaust passage of the engine in this order from the upstream of the exhaust passage, and a bypass passage for allowing the exhaust gas to bypass the reduction catalyst is provided downstream of the particulate filter, the method comprising the steps of:

allowing the exhaust gas having passed through the particulate filter to flow into the reduction catalyst in a normal operating period, so that, in the normal operating period, the particulate matters in the exhaust gas are removed by the particulate filter and the nitrogen oxides in the exhaust gas are purified by the reduction catalyst;

allowing the exhaust gas having passed through the particulate filter to flow into the bypass passage in a filter regenerating period other than the normal operating period in which the particulate matters removed by the particulate filter are forced to burn, so that, in the filter regenerating period, the exhaust gas is urged to bypass the reduction catalyst; and allowing the exhaust gas having passed through the particulate filter to flow into the reduction catalyst after the filter regenerating period is completed and a detected temperature of the exhaust gas having passed through the particulate filter falls and reaches a predetermined temperature.

\* \* \* \* \*